United States Patent
Lavoie et al.

(10) Patent No.: US 9,891,905 B2
(45) Date of Patent: Feb. 13, 2018

(54) UTILITY METER INTELLIGENT FIRMWARE UPDATE SYSTEM AND METHOD

(71) Applicant: General Electric Company, Schenectady, NY (US)

(72) Inventors: Gregory Paul Lavoie, Barrington, NH (US); Robert Edward Lee, Jr., Dover, NH (US); Guy P. Lafond, Portsmouth, NH (US); Jason Ignasi Subirana, Dover, NH (US); Jason Lee Perron, Dover, NH (US)

(73) Assignee: General Electric Company, Schenectday, NY (US)

( * ) Notice: Subject to any disclaimer, the term of this patent is extended or adjusted under 35 U.S.C. 154(b) by 139 days.

(21) Appl. No.: 14/177,170

(22) Filed: Feb. 10, 2014

(65) Prior Publication Data

US 2015/0227358 A1    Aug. 13, 2015

(51) Int. Cl.
*G06F 9/44* (2006.01)
*G06F 9/445* (2006.01)
(Continued)

(52) U.S. Cl.
CPC ............... *G06F 8/65* (2013.01); *G06F 8/665* (2013.01); *G06Q 50/06* (2013.01); *H04L 67/12* (2013.01);
(Continued)

(58) Field of Classification Search
CPC .. G06F 8/61; G06F 8/65; G06F 8/665; G06Q 50/06; H04L 67/12; G01D 4/002
See application file for complete search history.

(56) References Cited

U.S. PATENT DOCUMENTS

| 5,742,512 A | 4/1998 | Edge et al. |
| 6,459,258 B1 | 10/2002 | Lavoie et al. |

(Continued)

FOREIGN PATENT DOCUMENTS

| EP | 1985933 A2 | 10/2008 | |
| IL | GB 2478505 A * | 9/2011 | ............... G06F 8/66 |

OTHER PUBLICATIONS

Victor Custodio, A Large-Scale Wireless Network Approach for Intelligent and Automated Meter Reading of Residential Electricity, 2009, pp. 1-13. https://link.springer.com/content/pdf/10.1007/978-3-642-11528-8_3.pdf.*

(Continued)

*Primary Examiner* — Thuy Dao
*Assistant Examiner* — Mongbao Nguyen
(74) *Attorney, Agent, or Firm* — Eversheds Sutherland (US) LLP

(57) ABSTRACT

One embodiment describes a utility metering system. The utility metering system includes a utility meter that is communicatively coupled to a utility service provider, in which the utility meter includes firmware. The utility meter stores a firmware update downloaded from the utility service provider, and determines a particular time to update the firmware with the firmware update, in which the particular time is determined based at least in part on historical time of use data, time of use pricing rates, or a combination thereof. The historical time of use data include utility consumption by a consumer over time and the time of use pricing rates include the price per unit of utility charged to the consumer. Additionally, the utility meter updates the firmware at the particular time.

20 Claims, 4 Drawing Sheets

(51) Int. Cl.
*G06Q 50/06* (2012.01)
*H04L 29/08* (2006.01)
*G01D 4/00* (2006.01)

(52) U.S. Cl.
CPC ............ *G01D 4/002* (2013.01); *Y02B 90/241* (2013.01); *Y04S 20/32* (2013.01)

(56) References Cited

U.S. PATENT DOCUMENTS

| | | | |
|---|---|---|---|
| 6,486,652 B1 | 11/2002 | Ouellette et al. | |
| 6,564,159 B1 | 5/2003 | Lavoie et al. | |
| 6,778,920 B1 | 8/2004 | Balch et al. | |
| 6,868,349 B2 | 3/2005 | Fletcher et al. | |
| 7,065,457 B1* | 6/2006 | Germer | G01R 21/133 324/142 |
| 7,106,044 B1 | 9/2006 | Lee, Jr. et al. | |
| 8,375,385 B1* | 2/2013 | Harel | G06F 8/665 717/173 |
| 8,677,343 B2* | 3/2014 | Averbuch et al. | 717/171 |
| 8,869,135 B1* | 10/2014 | Fitzgerald | G06F 9/45533 717/168 |
| 2007/0136217 A1* | 6/2007 | Johnson | G06Q 50/06 705/412 |
| 2007/0226727 A1* | 9/2007 | Yeh | 717/168 |
| 2008/0178171 A1* | 7/2008 | Sueyoshi | G06F 8/65 717/171 |
| 2009/0222828 A1* | 9/2009 | Lefevre | G01D 4/004 718/102 |
| 2009/0299884 A1* | 12/2009 | Chandra | G06Q 30/04 705/34 |
| 2010/0299284 A1* | 11/2010 | Gristina et al. | 705/412 |
| 2011/0208369 A1* | 8/2011 | Yang et al. | 700/296 |
| 2011/0225072 A1* | 9/2011 | Sewell | 705/30 |
| 2011/0307882 A1 | 12/2011 | Shiba | |
| 2012/0044534 A1* | 2/2012 | Ichikawa | G06F 3/1204 358/1.15 |
| 2012/0060152 A1 | 3/2012 | Oh et al. | |
| 2012/0131324 A1* | 5/2012 | Ansari | H04Q 9/00 713/100 |
| 2012/0159142 A1* | 6/2012 | Jibbe | G06F 8/71 713/100 |
| 2012/0169512 A1* | 7/2012 | Carpman | G01F 1/60 340/870.16 |
| 2012/0229297 A1* | 9/2012 | Ree | H04L 12/2827 340/870.02 |
| 2012/0254661 A1* | 10/2012 | Tsongas | G06F 11/3013 714/32 |
| 2013/0055234 A1* | 2/2013 | Limbasia et al. | 717/173 |
| 2013/0074061 A1* | 3/2013 | Averbuch et al. | 717/171 |
| 2013/0117740 A1* | 5/2013 | Oh | G06F 8/665 717/171 |
| 2013/0125107 A1* | 5/2013 | Bandakka | G06F 8/665 717/171 |
| 2013/0185563 A1* | 7/2013 | Djabarov | G06F 9/44 713/176 |
| 2013/0205289 A1* | 8/2013 | Unno | G06F 8/65 717/171 |
| 2014/0019384 A1* | 1/2014 | Hanley | G06Q 50/06 705/412 |
| 2014/0028468 A1* | 1/2014 | Grady | G08C 15/00 340/870.03 |
| 2014/0149973 A1* | 5/2014 | Walter | G06F 8/71 717/170 |
| 2014/0173579 A1* | 6/2014 | McDonald | G06F 8/65 717/170 |
| 2015/0012624 A1* | 1/2015 | Geiger | H04L 43/0817 709/221 |

OTHER PUBLICATIONS

Oracle, Smart Metering for Water Utilities, 2009, pp. 1-15. http://www.oracle.com/us/industries/utilities/046596.pdf.*

UTC, Smart Meters and Smart Meter Systems: A Metering Industry Perspective, 2011, pp. 1-28. http://www.eei.org/issuesandpolicy/grid-enhancements/documents/smartmeters.pdf.*

European Search Report and Opinion issued in connection with corresponding EP Application No. dated May 4, 2015 15154422.8.

* cited by examiner

UTILITY METER INTELLIGENT FIRMWARE UPDATE SYSTEM AND METHOD

BACKGROUND

The subject matter disclosed herein relates to metering systems and more specifically, to firmware updates for utility meters.

Generally, a utility meter may monitor consumption of a utility service, such as electrical power, natural gas, or water. For example, a utility meter may provide a metering function by measuring a consumer's electricity usage. To facilitate the metering function as well as other functions, a utility meter may utilize firmware. As used herein, "firmware" is intended to describe non-transitory machine readable instructions that control certain operations of the utility meter. In some instances, it may be desirable to update the firmware utilized by a utility meter. For example, the firmware may be updated to upgrade the functionality of the utility meter. However, because the firmware may control the basic operation of the utility meter, in some embodiments, the functions provided by the utility meter may cease while the firmware is being updated. For example, the utility meter may stop metering the consumer's electricity usage while the firmware is being updated.

Accordingly, it would be beneficial to more efficiently manage when a utility meter's firmware is updated. For example, this may include minimizing the cost to a utility provider associated with updating the firmware.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment describes a utility metering system that includes a utility meter communicatively coupled to a utility service provider, in which the utility meter includes firmware. The utility meter stores a firmware update downloaded from the utility service provider, determines a particular time to update the firmware with the firmware update, in which the particular time is determined based at least in part on historical time of use data, time of use pricing rates, or a combination thereof. The historical time of use data includes utility consumption by a consumer over time and the time of use pricing rates include the price per unit of utility charged to the consumer. Additionally, the utility meter updates the firmware at the particular time.

A second embodiment describes a non-transitory tangible computer-readable medium storing a plurality of instructions executable by a processor of a utility meter. The instructions include instructions to store a firmware update in a memory of the utility meter, determine historical time of use data, in which the historical time of use data comprises utility consumption by a consumer over time, determine time of use pricing rates based on a price per unit of utility charged to the consumer at a plurality of times, dates, or a combination thereof, determine a particular time to update firmware of the utility meter with the firmware update, in which the particular time is based at least in part on the historical time of use data, the time of use pricing rates, or both, and update the firmware at the particular time.

A third embodiment describes a utility meter. The utility meter includes a non-volatile memory that stores firmware of the utility meter and a volatile memory that stores a firmware update. The utility meter further includes a processor that determines current utility usage and executes the firmware update to update the firmware when the utility usage falls below a usage threshold.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
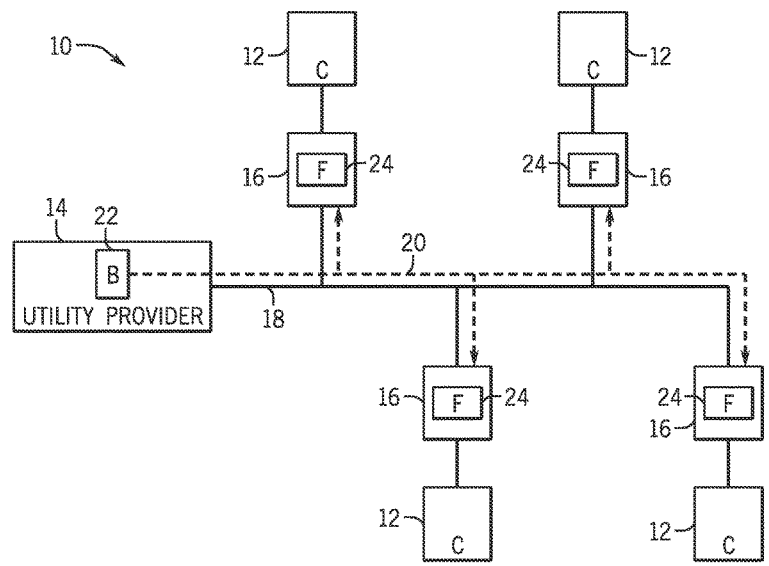
FIG. 1 is a block diagram of an energy generation, transmission, and distribution system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed above, firmware in a utility meter may control certain functionality of the utility meter, including basic functionality such as measuring power consumption of a residential or commercial customer. More specifically, the firmware may include non-transitory machine-readable instructions that instruct the utility meter on how to perform certain functions. For example, the firmware may instruct the utility meter on how to meter utility usage by the consumer. In some instances, the firmware utilized by the utility meter may be updated, for example, to upgrade the functionality of the utility meter or to prevent certain undesired behaviors. While the firmware is being updated, some functions provided by the utility meter may cease to operate because the firmware provides instructions relating to those functions. For example, the utility meter may stop metering utility usage while the firmware is updated. However, since a utility provider will continue supplying utilities to a consumer, even while the firmware is being updated, the utility usage during the firmware update may be unaccounted for by the utility meter (e.g., not billed to the consumer).

Accordingly, one embodiment of the present disclosure describes a utility metering system that includes a utility meter communicatively coupled to a utility service provider, in which the utility meter includes firmware. The utility meter stores a firmware update downloaded from the utility service provider, determines a particular time to update the firmware with the firmware update, in which the particular time is determined based at least in part on historical time of use data, time of use pricing rates, or a combination thereof. The historical time of use data includes utility consumption by a consumer over time and the time of use pricing rates include the price per unit of utility charged to the consumer. Additionally, the utility meter updates the firmware at the particular time. In other words, the utility meter firmware may be updated based on a consumer's utility usage history (e.g., historical time of use data) and/or the price per unit of utility (e.g., time of use pricing rates). For example, in some embodiments, the firmware may be updated when the consumer's utility usage is expected to be lowest based on the consumer's historical time of use data. Additionally, in some embodiments, the firmware may be updated when the time of use pricing rate is the lowest. Thus, the presently disclosed techniques may enable the firmware to be updated more efficiently, for example, to minimize the impact on the customer and the cost to the utility provider associated with updating the firmware. Similarly, in other embodiments, the firmware may also be updated when the consumer's utility usage falls below a usage threshold. It is to be noted that the update for each meter may be configurable by the utility. That is, the utility may remotely (or locally) set up individual meters for a given update technique (e.g., historical time of use data, time of use pricing rates, usage thresholds, or a combination thereof) and may subsequently change the update technique as desired.

By way of introduction, FIG. 1 describes a utility distribution and metering system 10. More specifically, the utility distribution and metering system 10 distributes utility services to various consumers 12 from a utility provider 14 and meters the utility usage by the consumers 12 via utility meters 16. As depicted, the utility provider 14 distributes utilities to the various consumers 12 through a distribution network 18. For example, when the utility provider 14 is providing electrical power, the distribution network 18 may be an electrical grid. Accordingly, the utility provider 14 may include power generation stations (e.g., using gas, coal, biomass, and other carbonaceous products for fuel), alternative power generation stations (e.g., using solar power, wind power, hydroelectric power, geothermal power, and other alternative sources of power), water processing plants, gas processing plants, and the like. To simplify the following discussion, the utility service provided will be described as electrical power; however, in other embodiments, other utilities such as water or natural gas may also be distributed and metered.

As described above, the utility meters 16 meter the utility usage of the various consumers 12, which may include commercial and/or residential consumers. As depicted, each consumer's usage may be monitored by a separate utility meter 16. In some embodiments, the utility meter 16 may be single-phase or poly-phase electrical meters. Additionally or alternatively, the utility meter 16 may be a smart meter such as an I-210 ANSI Meter, a kV2c ANSI Meter, an SGM3000 Meter, or an SGM1100 Meter made available by General Electric Company of Schenectady, N.Y. More specifically, each utility meter 16 may gather data that characterizes the consumer's utility usage such as energy usage, maximum energy demand, minimum energy demand, demand interval length, time of use (TOU) calendars, status information, and the like. The gathered data may then be communicated to the utility provider 14 via a communication network 20. In some embodiments, the communication network 20 may be included in the distribution network 18, for example, as a power-line communication network 20.

In an example, a utility meter 16 may communicate the gathered data (e.g., utility usage data) to the utility provider's billing system 22. In some embodiments, the energy usage data may include total active energy usage (e.g., kilowatt hour [kWh]) and maximum energy demand (e.g., kW) to enable the utility provider 14 to bill the consumer 12. Accordingly, the billing system 22 may be included in one or more computing devices, such as a workstation, mobile device, or desktop computer. Additionally, the communication network 20 may be wired, wireless, or both. For example, a utility meter 16 may wirelessly communicate with a handheld meter reader or communicate via a smart grid. In some embodiments, the communication network 20 may include advanced metering infrastructure (AMI) to enable two-way communication between the utility provider 14 and the utility meters 16. For example, this may enable the utility provider 14 to schedule disconnection or connection of utility services, automatic meter reading (AMR), load shedding/control, smart grid applications, outage reporting, transmitting utility meter firmware updates, and the like.

Figure 2:
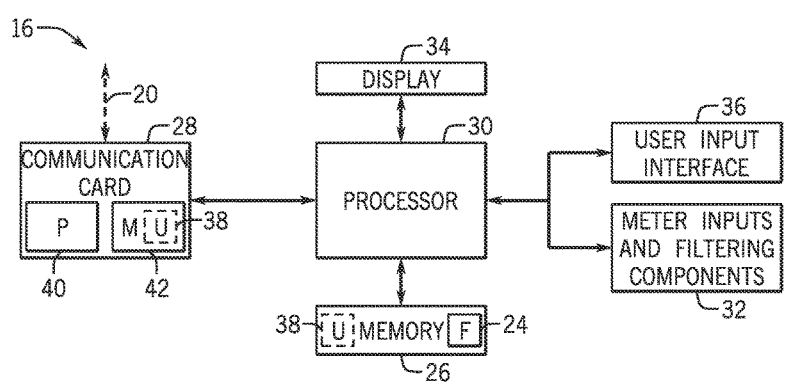
FIG. 2 is a block diagram illustrating components of a utility meter of FIG. 1, in accordance with an embodiment.

As described above, to facilitate such functions of the utility meter 16 (e.g., metering utility usage), each utility meter 16 includes firmware 24. As depicted in FIG. 2, the firmware 24 may be stored in memory 26 of the utility meter 16. Additionally, to facilitate functions of the utility meter 16, the utility meter 16 may include a communication system 28 (e.g., communication card), one or more processor(s) 30, meter inputs/filtering components 32, a display 34, and a user input interface 36. More specifically, the various data, such as utility usage data, may be collected by the utility meter 16 via the meter inputs and filtering components 32 from various sensors, such as current or voltage sensors. Accordingly, in some embodiments, the meter inputs and filtering components 32 may include voltage and current inputs, one or more ADCs, and/or frequency filtering components.

As depicted, the meter inputs and filtering components 32 are operatively coupled to the processor 30 to communicate the collected data to the processor 30. More specifically, the processor 30 may perform various monitoring and/or control functions. For example, the processor 30 may time align meter measurements received from the meter inputs and filtering components 32. To facilitate these various functions, the processor 30 is also operatively coupled to the memory 26 that stores content, data, instructions, or the like. For example, memory 26 may be a tangible non-transitory medium that may store data (e.g., utility usage data) transmitted to/from the utility meter 16 as well as instructions (e.g., firmware 24) that enable the processor 30 to execute steps associated with operation of the utility meter 16. In some embodiments, the firmware 24 may be stored in flash upgradable memory, but the memory 26 may additionally include read-only memory (ROM). Accordingly, the memory 26 may include non-volatile memory (e.g., an upgradable portion, ROM, hard disks, or magnetic tape) as well as volatile memory (e.g., random-access memory).

Additionally, the display 34 and the user input interface 36 enable a user (e.g., the consumer 12 or the utility provider 14) to interact directly with the utility meter 16. For example, the display 34 may communicate information to the user by displaying information such as energy usage, instantaneous power usage, error messages, meter status, and the like. Accordingly, the display 34 may be a light-emitting diode (LED) display, a liquid crystal display (LCD), or the like. The user input interface 36 may receive user inputs. For example, the user input interface 36 may enable the user to configure the utility meter 16, select different information to display, and the like. Accordingly, the user input interface 36 may include a keypad, a joystick, a touch-screen display, a data input device (e.g., CD-Drive or USB port), or the like.

Furthermore, the utility meter 16 may interface with the communication network 20 via the communication card 28. In other words, the communication card 28 enables the utility meter 16 to communicate with the utility provider 14, or other entities (e.g., regulatory entities). As described above, the communication network 20 may enable two-way communication between the utility meter 16 and the utility provider 14. In other words, in addition to transmitting data, such as utility usage data, from the utility meter 16 to the utility provider 14, the communication card 28 may receive data, such as firmware updates 38, from the utility provider 14. To facilitate the communication with the utility provider 14, the communication card 28 may share the processor 30 and memory 26. Additionally or alternatively, the communication card 28 may include a dedicated processor 40 and/or memory 42.

In some embodiments, the utility provider 14 may transmit a firmware update 38 over the communication network 20 and the communication card 28 may receive (e.g., download and store) the firmware update 38. As depicted, the firmware update 38 may be stored in the utility meter memory 26 or in the communication card memory 42. As described above, the firmware 24 may be updated for various reasons, such as to upgrade functionality of the utility meter 16. Accordingly, the firmware update 38 may be a file that includes non-transitory computer readable instructions that update (e.g., modify) the firmware 24 when executed, for example, by the utility meter processor 30 or communication card processor 40.

Figure 3:
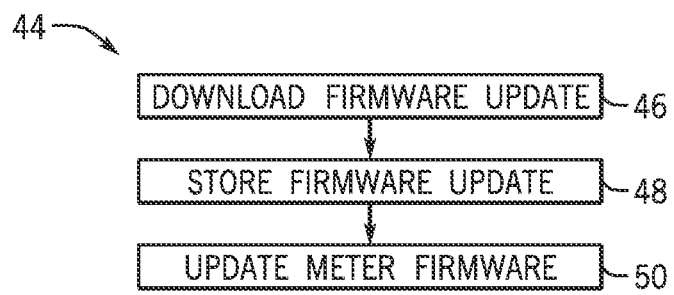
FIG. 3 is a flow chart describing updating firmware of the utility meter of FIG. 2, in accordance with an embodiment.

One embodiment of a process 44 for updating the firmware 24 is described in FIG. 3. The process 44 may be implemented via non-transitory computer executable instructions stored in the memory 26, 42, and/or other memories and executed via processor 30, 40, and/or other processors. Generally, the process 44 may include downloading a firmware update (process block 46), storing the firmware update (process block 48), and updating the utility meter firmware (process block 50).

More specifically, the utility meter 16 may download the firmware update from the utility provider 14 (process block 46). In some embodiments, the communication card 28 may download a file containing the firmware update 38 from the utility provider 14 via the communication network 20. In such embodiments, the communication card 28 may download the firmware update 38 by periodically polling the utility provider 14 for updates. Additionally or alternatively, the utility provider 14 may push updates to the utility meter 16 whenever available. In other words, the firmware update 38 may be downloaded to the utility meter 16 at various times, for example based on the traffic (e.g., when traffic is at a low ebb) on the communication network 20 or when the firmware update 38 is made available. In other embodiments, the firmware update 38 may be downloaded directly to the utility meter via the user input interface 36. For example, a service technician may connect an external storage device, such as a flash drive, to the user input interface 36 and download a file containing the firmware update 38 to the utility meter 16.

After the firmware update 38 is downloaded, the utility meter 16 may store the firmware update 38 in the utility meter memory 26 and/or the communication card memory 42 (process block 48). As described above, the firmware update 38 may be downloaded at various times. Additionally, when the firmware 24 is being updated, utility meter functions, such as metering utility usage, may stop. In other words, depending on when the firmware update 38 is downloaded, it may not always be desirable to immediately update the firmware 24. Thus, storing the firmware update 38 in memory 26 and/or 42 enables the firmware 24 to be updated at a later time (e.g., a more desirable time). Furthermore, since the firmware update 38 may be executed by a processor, the firmware update 38 may be stored in volatile memory (e.g., random-access memory) included in the utility meter memory 26 or the communication card memory 42.

The utility meter 16 may then update the firmware 24 by executing the firmware update 38 (e.g., flashing the memory 26), for example, with the utility meter processor 30 and/or the communication card processor 40 (process block 50). Since some functions of the utility meter 16 may cease while the firmware 24 is being updated, it would be beneficial to update the firmware 24 based on the functions that will cease. In some embodiments, this may include selecting a particular time to update the firmware 24 or setting operational conditions (e.g., a usage threshold) to update the firmware 24. For example, if the update will cause the utility meter 16 to cease metering a consumer's utility usage, it may be beneficial to update the firmware 24 at a particular time that is expected to revenue loss (e.g., unaccounted utility usage) by the utility provider 14 associated with updating the utility meter firmware 24. It is to be noted that different updates may affect the utility meter 16 in different ways, and accordingly, each update time may be customized based on the effect of the update.

Figure 4:
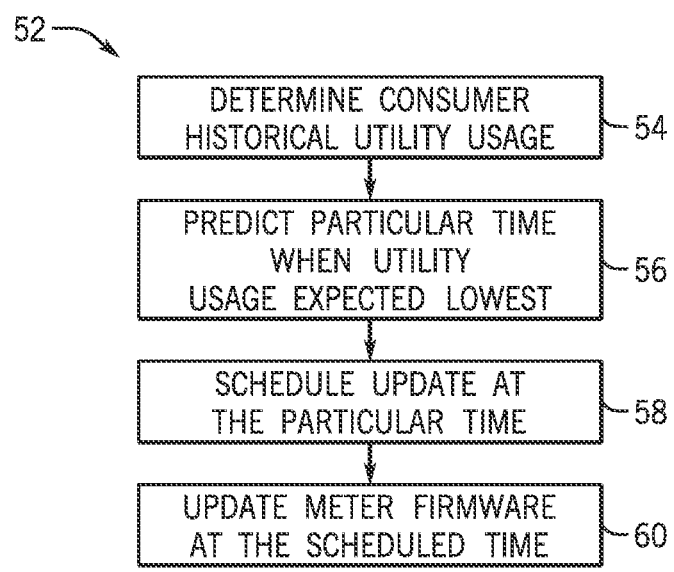
FIG. 4 is a flow chart describing performing the firmware update based on consumer time of use (TOU), in accordance with an embodiment.

One embodiment of a process 52 for updating the firmware 24 at a particular time is described in FIG. 4. The process 52 may be implemented via non-transitory computer executable instructions stored in the memory 26, 42, and/or other memories and executed via processor 30, 40, and/or other processors. Generally the process 52 includes determining an individual consumer's historical utility usage (process block 54), predicting a particular time when utility usage is expected to be lowest (process block 56), scheduling a firmware update at the particular time (process block 58), and updating the firmware at the scheduled time (process block 60). As described below, depending on the implementation of the process 52, each step in the process 52 may be performed by the utility meter 16, the utility provider 14, or both.

For example, the utility meter 16 may determine the consumer's historical utility usage by retrieving time of use data (process block 54). As described above, the time of use data describes the consumer's utility usage over time. In some embodiments, the utility meter 16 may receive the time of use data from the utility provider 14, for example, along with the firmware update 38 or separately. Additionally or alternatively, the utility meter 16 may retrieve time of use data stored in the utility meter memory 26.

Based on the historical utility usage, the utility meter 16 may predict when the consumer's utility usage is expected to be lowest (process block 56). More specifically, the utility meter 16 may analyze the time of use data to determine when utility usage has historically been lowest. Additionally, it may be assumed that a consumer's utility usage is generally repetitive (e.g., more predictable). For example, one consumer 12 may sleep at relatively consistent times and another consumer 12 may set air conditioning units to operate on a set schedule. Accordingly, the utility meter 16 may predict a particular time when the consumer's utility usage will likely be lowest based on when utility usage has historically been lowest. For example, from the time of use data, the utility meter 16 may identify a time in each day of the past seven days when the utility usage has been lowest and take an average of the times identified. Additionally or alternatively, the utility meter 16 may predict future utility usage by extrapolating the time of use data into the future and selecting the time with the lowest predicted utility usage. As can be appreciated, anomalies may occur in a consumer's utility usage. Accordingly, the amount of historical time of use data may be increased to reduce the effect of anomalies or reduced to reduce computational complexity.

Moreover, the predicted particular time may be selected from varying time periods. For example, in some embodiments, the utility meter 16 may identify a particular time in a day that utility usage is expected to be lowest. In other embodiments, the utility meter 16 may identify a particular time in a week that utility usage is expected to be lowest. The time period from which the particular time is selected from may depend on various factors, such as the functionality of the utility meter 16 or the importance of the firmware update 38. For example, a utility meter 16 may select the particular time from a day (e.g., 24 hours) to reduce the computational complexity of the prediction. More specifically, selecting from a single day may enable the utility meter 16 to analyze less time of use data because each day is accounted for equally. Conversely, a utility meter 16 may select the particular time from a week (e.g., 168 hours) to better account for a consumer's weekly routine. Illustratively, a consumer 12 may stay up later each Monday to watch Monday Night Football or a consumer 12 may wake up later each Saturday because he does not need to go to work. Likewise, commercial consumers 12 may cease operation at certain times (e.g., weekends). Additionally, a utility meter 16 may select the particular time from a shorter time period (e.g., the coming day) when the firmware update 38 is more important (e.g., to fix a bug) and may select from a longer time period (e.g., the coming week) when the firmware update 38 is less important (e.g., to update functionality). In other words, predicting the particular time may include determining a time period to select the particular time from.

The utility meter 16 may then schedule to update the firmware 24 at the particular time (process block 58). More specifically, the utility meter 16 may schedule the update on a calendar included in the utility meter 16. As described above, the particular time may be selected from different time periods. Accordingly, in some embodiments, the calendar may include one day, one week, one month, one year or more. Additionally, the calendar may be stored in the utility meter memory 26 or the communication card memory 42. Accordingly, the utility meter 16 may schedule the firmware update by writing a firmware update event to the memory 26 or 42.

At the scheduled time, the utility meter 16 may update the firmware 24 with the firmware update 38 (process block 60). More specifically, the utility meter 16 may execute the instructions included in the firmware update 38, for example, with the utility meter processor 30. As described above, the firmware 24 may be stored in non-volatile memory included in the utility meter memory 26. Accordingly, when the firmware update 38 is executed, the utility meter 16 may write to (e.g., modify) the utility meter memory 26 to update the firmware 24.

The above described embodiment generally refers to the utility meter 16. In some embodiments, the processes performed by the utility meter 16 may more specifically be performed by the communication card 28 to enable the utility meter processor 30 and/or memory 26 to perform other processes. For example, the communication card 28 may determine the consumer's historical utility usage (process block 54), predict a particular time when the utility usage is expected to be lowest (process block 56), and schedule a firmware update at the particular time (process block 58). The communication card 28 may then instruct the utility meter processor 30 to update the firmware 24 at the scheduled time.

As described above, in other embodiments, the utility provider 14 may perform some or all of the steps of process 52, which may reduce processing requirements of the utility meter 16. For example, the utility provider 14 may retrieve the time of use data from a storage database or from the utility meter 16 (process block 54), and predict a particular time when utility usage is expected to be lowest (process block 56). The utility provider 14 may then schedule the firmware update in a calendar at the utility provider 14 (process block 58), and instruct the utility meter 16 to update the firmware 24 at the scheduled time (process block 60). Additionally or alternatively, the utility provider 14 may instruct the utility meter 16 to schedule the firmware update in a calendar included in the utility meter 16 (process block 58), and the utility meter 16 may update the firmware 24 at the scheduled time (process block 60).

Figure 5:
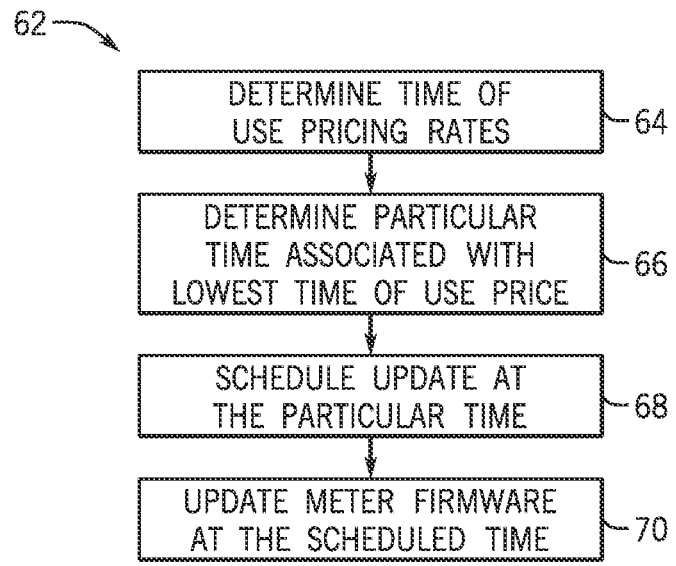
FIG. 5 is a flow chart describing performing the firmware update based on time of use (TOU) pricing rates, in accordance with an embodiment.

Another embodiment of a process 62 for updating the firmware 24 at a particular time is described in FIG. 5. The process 62 may be implemented via non-transitory computer executable instructions stored in the memory 26, 42, and/or other memories and executed via processor 30, 40, and/or other processors. Generally the process 62 includes determining time of use pricing rates (process block 64), determining a particular time associated with lowest time of use pricing rate (process block 66), scheduling a firmware update at the particular time (process block 68), and updating the firmware at the scheduled time (process block 70). Similar to process 52, depending on the implementation of the process 62, each step in the process 62 may be performed by the utility meter 16, the utility provider 14, or both.

For example, the utility meter 16 may determine the time of use pricing rates (process block 64). As described above, the time of use pricing rates describe the price per unit of a utility based on when the unit of utility was consumed. In some embodiments, the utility meter 16 may receive the time of use pricing rates from the utility provider 14, for example along with the firmware update 38 or separately. Additionally or alternatively, the utility meter 16 may retrieve time of use pricing rates stored in the utility meter memory 26.

Based on the time of use pricing rates, the utility meter 16 may determine a particular time associated with the lowest time of use pricing rate (process block 66). As can be appreciated, the time of use pricing rates may vary throughout each day and may additionally vary for different days of the week. For example, the time of use pricing rate at a particular time may be lower on a weekend as compared to on a weekday. Accordingly, the particular time may be selected from varying time periods. For example, in some embodiments, the utility meter 16 may identify a particular time in a day associated with the lowest time of use pricing rate. In other embodiments, the utility meter 16 may identify a particular time in a week associated with the lowest time of use pricing rate.

Similar to process block 56, the time period from which the particular time associated with the lowest time of use pricing rate is selected may depend on various factors, such as the functionality of the utility meter 16 and/or an importance assigned to the firmware update 38, for example, by the utility provider 14. For example, a utility meter 16 may select the particular time from a day to reduce the complexity of the prediction. More specifically, selecting from a single day may enable the utility meter 16 to analyze only the time of use pricing rates associated with that day. Conversely, a utility meter 16 may select the particular time from a week to account for the pricing variations from day to day. Moreover, a utility meter 16 may even select the particular time from a year to account for pricing variations month to month. Additionally, a utility meter 16 may select the particular time from a shorter time period (e.g., the coming day) when the firmware update 38 is more important (e.g., to replace a basic feature) and may select from a longer time period (e.g., the coming week) when the firmware update 38 is less important (e.g., to update functionality). In other words, determining the particular time may include determining a time period to select the particular time from.

The utility meter 16 may then schedule to update the firmware 24 at the particular time (process block 68). More specifically, the utility meter 16 may schedule the update on a calendar included in the utility meter 16. As described above, the particular time may be selected from different time periods. Accordingly, in some embodiments, the calendar may include one day, one week, one month, one year or more. Additionally, the calendar may be stored in the utility meter memory 26 or the communication card memory 42. Accordingly, the utility meter 16 may schedule the firmware update by writing a firmware update event to the memory 26 or 42.

At the scheduled time, the utility meter 16 may update the firmware 24 with the firmware update 38 (process block 70). More specifically, the utility meter 16 may execute the instructions included in the firmware update 38, for example, with the utility meter processor 30. As described above, the firmware 24 may be stored in non-volatile memory included in the utility meter memory 26. Accordingly, when the firmware update 38 is executed, the utility meter 16 may write to (e.g., modify) the utility meter memory 26 to update the firmware 24.

The above described embodiment generally refers to the utility meter 16. Similar to process 52, in some embodiments, the steps performed by the utility meter 16 may more specifically be performed by the communication card 28 to enable the utility meter processor 30 and/or memory 26 to perform other processes. For example, the communication card 28 may determine the time of use pricing rates (process block 64), determine a particular time associated with the lowest time of use pricing rate (process block 66), and schedule a firmware update at the particular time (process block 68). The communication card 28 may then instruct the utility meter processor 30 to update the firmware 24 at the scheduled time.

As described above, in other embodiments, the utility provider 14 may perform some or all of the steps of process 62, which may reduce processing requirements of the utility meter 16. For example, the utility provider 14 may retrieve the time of use pricing rates from the billing system 22 (process block 64), and determine a particular time associated with the lowest time of use pricing rate (process block 66). The utility provider 14 may then schedule the firmware update in a calendar at the utility provider 14 (process block 68), and instruct the utility meter 16 to update the firmware 24 at the scheduled time (process block 70). Additionally or alternatively, the utility provider 14 may instruct the utility meter 16 to schedule the firmware update in a calendar included in the utility meter 16 (process block 68), and the utility meter 16 may update the firmware 24 at the scheduled time (process block 70).

Figure 6:
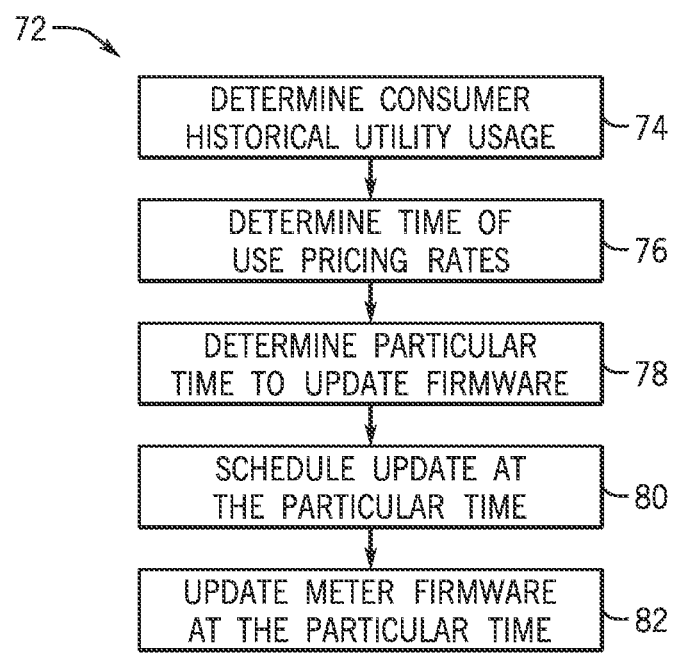
FIG. 6 is a flow chart describing performing the firmware update based on both consumer time of use (TOU) and time of use (TOU) pricing rates, in accordance with an embodiment.

Another embodiment of a process 72 for updating the firmware at a particular time is described in FIG. 6. The process 72 may be implemented via non-transitory computer executable instructions stored in the memory 26, 42, and/or other memories and executed via processor 30, 40, and/or other processors. More specifically, the process 72 may incorporate the factors described in process 52 (e.g., predicted utility usage), the factors described in process 62 (e.g., time of use pricing rates), as well as other factors. Generally the process 72 includes determining a consumer's historical utility usage (process block 74), determining time of use pricing rates (process block 76), determining a particular time to update the utility meter firmware (process block 78), scheduling the update at the particular time (process block 80), and updating the utility meter firmware at the scheduled time (process block 82). Similar to processes 52 and 62, depending on the implementation of the process 72, each step in the process 72 may be performed by the utility meter 16, the utility provider 14, or both.

For example, similar to process block 54, the utility meter 16 may determine a consumer's historical utility usage by retrieving time of use data (process block 74). More specifically, the utility meter 16 may receive the time of use data from the utility provider 14, for example along with the firmware update 38 or separately. Additionally or alternatively, the utility meter 16 may retrieve time of use data stored in the utility meter memory 26.

Additionally, similar to process block 64, the utility meter 16 may determine the time of use pricing rates (process block 76). More specifically, the utility meter 16 may receive the time of use pricing rates from the utility provider 14, for example along with the firmware update 38 or separately. Additionally or alternatively, the utility meter 16 may retrieve time of use pricing rates stored in the utility meter memory 26.

Based at least in part on the consumer's historical utility usage and the time of use pricing rates, the utility meter 16 may determine a particular time to update the firmware 24

(process block 78). For example, in some embodiments, the utility meter 16 may predict a first time when the consumer's utility usage is expected to be lowest based on the consumer's historical utility usage similar to process block 58 and determine a second time associated with the lowest time of use pricing rate similar to process block 66. To determine the particular time to update the firmware 24, the utility meter may then take an average or a weighted average of the first time and the second time. More specifically, the weighted average of the first and second time may account for various factors. For example, the second time may be weighted more heavily because the time of use pricing rates are generally predetermined whereas the prediction of utility usage may suffer from unpredictable anomalies. Additionally or alternatively, the first time may be weighted more heavily when more time of use data was analyzed to select the first time. In other words, the predictability of the utility usage may be factored in, for example, by taking into account the standard deviation of historical utility usage at the predicted time.

In other embodiments, the utility meter 16 may predict the revenue missed by the utility provider 14 (e.g., utility usage not billed to the consumer 12) and determine a particular time to update the firmware 24 when the predicted revenue missed is lowest (process block 78). More specifically, the utility meter 16 may predict expected utility usage over a coming time period (e.g., a coming day or a coming week) by extrapolating a consumer's historical utility usage. The utility meter 16 may then predict the amount that could be billed to the consumer 12 based on the predicted utility usage and the time of use pricing rates for the coming time period. In some embodiments, explicitly calculating the missed revenue may enable the utility meter 16 to better account for variations in each individual consumer's routine. For example, a consumer 12 may be a computer gamer that stays up all night using his computer and sleeps all day. In other words, the majority of the consumer's utility usage is during lower time of use pricing rates. Accordingly, even though the time of use pricing rate is lower, the revenue lost by the utility provider may be higher than when the time of use pricing rate is higher.

The utility meter 16 may then schedule to update the firmware 24 at the particular time (process block 78). More specifically, the utility meter 16 may schedule the update on a calendar included in the utility meter 16. As described above, the particular time may be selected from different time periods. Accordingly, in some embodiments, the calendar may include one day, one week, one month, one year or more. Additionally, the calendar may be stored in the utility meter memory 26 or the communication card memory 42. Accordingly, the utility meter 16 may schedule the firmware update by writing a firmware update event to the memory 26 or 42.

At the scheduled time, the utility meter 16 may update the firmware 24 with the firmware update 38 (process block 80). More specifically, the utility meter 16 may execute the instructions included in the firmware update 38, for example, with the utility meter processor 30. As described above, the firmware 24 may be stored in non-volatile memory included in the utility meter memory 26. Accordingly, when the firmware update 38 is executed, the utility meter 16 may write to (e.g., modify) the utility meter memory 26 to update the firmware 24.

The above described embodiment generally refers to the utility meter 16. Similar to processes 52 and 62, in some embodiments, the steps performed by the utility meter 16 may more specifically be performed by the communication card 28 to enable the utility meter processor 30 and/or memory 26 to perform other processes. For example, the communication card 28 may determine a consumer's historical utility usage (process block 74), determine time of use pricing rates (process block 76), determine a particular time to update the firmware (process block 78), and schedule a firmware update at the particular time (process block 80). The communication card 28 may then instruct the utility meter processor 30 to update the firmware 24 at the scheduled time (process block 82).

As described above, in other embodiments, the utility provider 14 may perform some or all of the steps of process 72, which may reduce processing requirements of the utility meter 16. For example, the utility provider 14 may determine a consumer's historical utility usage (process block 74), determine time of use pricing rates (process block 76), and determine a particular time to update the firmware (process block 78). The utility provider 14 may then schedule the firmware update in a calendar at the utility provider 14 (process block 80), and instruct the utility meter 16 to update the firmware 24 at the scheduled time (process block 82). Additionally or alternatively, the utility provider 14 may instruct the utility meter 16 to schedule the firmware update in a calendar included in the utility meter 16 (process block 80), and the utility meter 16 may update the firmware 24 at the scheduled time (process block 82).

Figure 7:
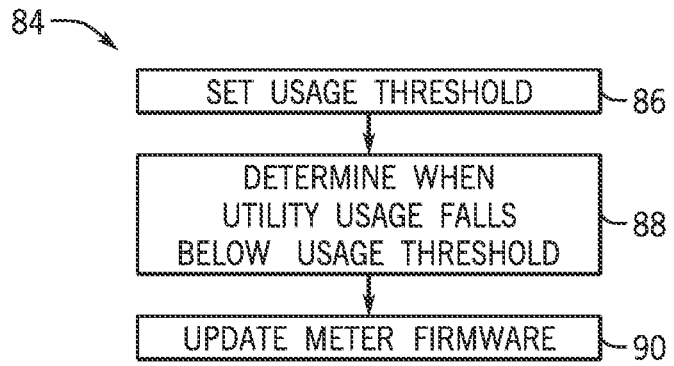
FIG. 7 is a flow chart describing performing the firmware update based on when usage falls below a set threshold, in accordance with an embodiment.

Another embodiment of a process 84 for updating the firmware is described in FIG. 7. The process 84 may be implemented via non-transitory computer executable instructions stored in the memory 26, 42, and/or other memories and executed via processor 30, 40, and/or other processors. Generally the process 84 includes setting a usage threshold (process block 86), determining when utility usage falls below the usage threshold (process block 88), and updating the utility meter when the utility usage is below the usage threshold (process block 90). In other words, process 84 describes updating the firmware 24 based on operational conditions (e.g., usage threshold).

More specifically, the utility provider 14 may set the usage threshold and communicate the threshold to the utility meter 16, for example, along with the firmware update 38 (process block 86). Additionally or alternatively, the usage threshold may be preset in the utility meter 16, for example during manufacture or deployment of the utility meter 16. In some embodiments, the usage threshold may be set based on various factor, such as the importance of the firmware update 38. For example, if the firmware update 38 is more important (e.g., to replace a basic feature) the usage threshold may be set higher so that the firmware 24 will likely be updated sooner. On the other hand, if the firmware update 38 is less important (e.g., to upgrade functionality) the usage threshold may be set lower to minimize the amount of unaccounted utility usage.

Based on the usage threshold, the utility meter 16 determines when a consumer's utility usage falls below the usage threshold (process block 88). As described above, the utility meter 16 may meter the consumer's utility usage via meter inputs and filtering components 32. Accordingly, the utility meter 16 may determine when the utility usage has fallen below the usage threshold by comparing the consumer's utility usage and the usage threshold.

When the utility usage falls below the usage threshold, the utility meter 16 updates the firmware 24 (process block 90). More specifically, the utility meter 16 may execute the instructions included in the firmware update 38, for example with the utility meter processor 30. As described above, the firmware 24 may be stored in non-volatile memory included in the utility meter memory 26. Accordingly, when the firmware update 38 is executed, the utility meter 16 may write to (e.g., modify) the utility meter memory 26 to update the firmware 24.

Figure 8:
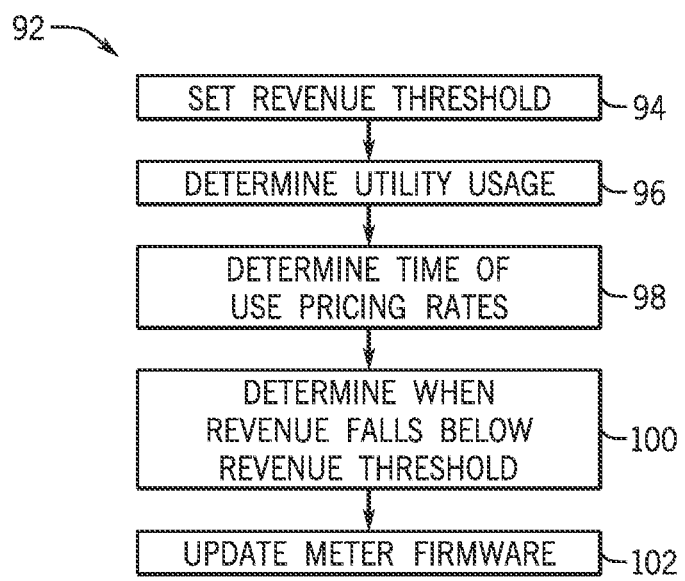
FIG. 8 is a flow chart describing performing the firmware update based on when revenue falls below a set threshold, in accordance with an embodiment.

A further embodiment of a process 92 for updating the firmware is described in FIG. 8. The process 92 may be implemented via non-transitory computer executable instructions stored in the memory 26, 42, and/or other memories and executed via processor 30, 40, and/or other processors. Generally the process 92 includes setting a revenue threshold (process block 94), determining utility usage (process block 96), determining time of use pricing rates (process block 98), determining when revenue falls below the revenue threshold (process block 100), and updating the utility meter firmware when the revenue is below the revenue threshold (process block 102). In other words, process 92 describes updating the firmware 24 based indirectly on operational conditions (e.g., revenue threshold). More specifically, updating based on revenue may reduce cost associated with updating the firmware 24 by weighting utility usage (e.g., operational condition) with time of use pricing rates. Similar to processes 52, 62, and 72, depending on the implementation of the process 92, each step in the process 92 may be performed by the utility meter 16, the utility provider 14, or both.

For example, the utility provider 14 may set the revenue threshold and communicate the threshold to the utility meter 16, for example, along with the firmware update 38 (process block 94). Additionally or alternatively, the revenue threshold may be preset in the utility meter 16, for example during manufacture or deployment of the utility meter 16. In some embodiments, the revenue threshold may be set based on various factor such as the importance of the firmware update 38. For example, if the firmware update 38 is more important (e.g., to replace a basic feature) the revenue threshold may be set higher so that the firmware 24 will likely be updated sooner. On the other hand, if the firmware update 38 is less important (e.g., to upgrade functionality) the revenue threshold may be set lower to minimize the revenue lost by the utility provider 14 (e.g., not billed to the consumer 12).

Based on the revenue threshold, the utility meter 16 determines when revenue falls below the revenue threshold (process block 100). More specifically, similar to process block 88, the utility meter 16 may determine the consumer's utility usage (process block 96), and, similar to process block 64, the utility meter 16 may then determine the time of use pricing rates (process block 98). Accordingly, the utility meter 16 may calculate the revenue based on the utility usage and the time of use pricing rates, and determine when the revenue has fallen below the revenue threshold by comparing the calculated revenue and the revenue threshold.

When the utility revenue falls below the revenue threshold, the utility meter 16 updates the firmware 24 (process block 102). More specifically, the utility meter 16 may execute the instructions included in the firmware update 38, for example with the utility meter processor 30. As described above, the firmware 24 may be stored in non-volatile memory included in the utility meter memory 26. Accordingly, when the firmware update 38 is executed, the utility meter 16 may write to (e.g., modify) the utility meter memory 26 to update the firmware 24.

As described above, in other embodiments, the utility provider 14 may perform some or all of the steps of process 92, which may reduce processing requirements of the utility meter 16. For example, the utility provider 14 may set and keep track of the revenue threshold (process block 94), determine a consumer's utility usage by receiving it from the utility meter 16 (process block 96), determine time of use pricing rates (process block 98), determine when revenue falls below the revenue threshold and instruct the utility meter 16 to update the firmware 24 at that time (process block 100). The utility meter 16 may then update the firmware 24 (process block 102).

Technical effects of the present disclosure include improving efficiency of firmware updates and reducing cost associated with firmware updates to a utility meter, which may include minimizing cost to a utility provider. More specifically, the utility meter may cease certain functions while updating the firmware, such as metering utility usage. Accordingly, in some embodiments, the amount of utility usage unaccounted for by the utility provider may be reduced by predicting a particular time when utility usage will be lowest and updating the firmware at the particular time, thus improving efficiency of power delivered by the utility provided. In other embodiments, the revenue lost by the utility provider may be reduced by determining a particular time associated with the lowest time of use pricing rate and updating the firmware at the particular time. Additionally, other factors, such as the importance of the firmware update and the predictability of future utility usage, may also be considered. In other words, the techniques described in the present disclosure enable a utility meter's firmware to be updated more intelligently.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A utility metering system, comprising:
a utility meter configured to communicatively couple to a utility service provider, wherein the utility meter comprises a memory configured to store firmware, wherein the firmware comprises computer-readable instructions configured to:
store a firmware update downloaded from the utility service provider, wherein the firmware update is downloaded by periodically polling the utility service provider for updates;
receive a historical time of use data for a customer and determine when utility usage by the customer is lowest;
receive a time of use pricing rate for the customer and determine when utility price for the customer is lowest;
receive a usage threshold associated with the utility usage by the customer and determine when the utility usage by the customer falls below the usage threshold;
receive a criticality of the firmware update and determine when the criticality exceeds a threshold criticality;
receive an updated usage threshold associated with the utility usage by the customer based on the criticality of the firmware update and determine when the utility usage by the customer falls below the updated usage threshold;
receive a selection of a particular time to implement the firmware update based on determining when utility usage by the customer is lowest, when utility price for the customer is lowest, when the utility usage by the customer falls below the usage threshold, when the criticality exceeds a threshold criticality, when the utility usage by the customer falls below the updated usage threshold; and implement the firmware update at the particular time.

2. The utility metering system of claim 1, wherein the historical time of use data comprises utility consumption by a consumer over time and the time of use pricing rates comprises the price per unit of utility charged to the consumer over time.

3. The utility metering system of claim 1, wherein the utility meter is configured to determine the particular time by predicting when utility usage by the consumer will be lowest based at least in part on the historical time of use data.

4. The utility metering system of claim 1, wherein the utility meter is configured to determine the particular time by determining when a time of use pricing rate is lowest based on the time of use pricing rates, wherein the utility meter is configured to retrieve the time of use pricing rates from the utility service provider.

5. The utility metering system of claim 1, wherein the utility meter is configured to determine the particular time by:
predicting a first time when utility usage by the consumer is expected to be lowest based at least in part on the historical time of use data;
determining a second time when a time of use pricing is lowest based on the time of use pricing rates; and
taking a weighted average of the first time and the second time.

6. The utility metering system of claim 1, wherein the utility meter comprises a communication card, wherein the communication card is configured to store the firmware update.

7. The utility metering system of claim 1, wherein the utility meter is configured to determine a time period from which to select the particular time to update the firmware.

8. The utility metering system of claim 1, wherein the utility meter is configured to determine the particular time by receiving the particular time from the utility service provider.

9. The utility metering system of claim 1, wherein the utility meter is configured to determine the particular time based at least in part on an importance of the firmware update.

10. A non-transitory tangible computer-readable medium storing a plurality of instructions executable by a processor of a utility meter, the instructions configured to:
store a firmware update in a memory of the utility meter, wherein the firmware update is downloaded by periodically polling a utility service provider for updates;
receive a historical time of use data for a customer and determine when utility usage by the customer is lowest;
receive a time of use pricing rate for the customer and determine when utility price for the customer is lowest;
receive a usage threshold associated with the utility usage by the customer and determine when the utility usage by the customer falls below the usage threshold;
receive a criticality of the firmware update and determine when the criticality exceeds a threshold criticality;
receive an updated usage threshold associated with the utility usage by the customer based on the criticality of the firmware update and determine when the utility usage by the customer falls below the updated usage threshold;
determine a particular time to update firmware of the utility meter with the firmware update, wherein the particular time is selected based on determining when utility usage by the customer is lowest, when utility price for the customer is lowest, when the utility usage by the customer falls below the usage threshold, when the criticality exceeds a threshold criticality, when the utility usage by the customer falls below the updated usage threshold; and update the firmware at the particular time.

11. The medium of claim 10, wherein the instructions configured to determine the particular time comprises instructions configured to predict when utility usage by the consumer will be lowest based at least in part on the historical time of use data.

12. The medium of claim 10, wherein the instructions configured to determine the particular time comprises instructions configured to determine when a time of use pricing rate is lowest, wherein the time of use pricing rates are communicated from a utility service provider.

13. The medium of claim 10, wherein the instruction configured to determine the particular time comprises instructions configured to:
predict a first time when the utility usage by the consumer is expected to be lowest based at least in part on the historical time of use data;
determine a second time when a time of use pricing rate is lowest based on the time of use pricing rates; and
take a weighted average of the first time and the second time.

14. The medium of claim 10, comprising instructions configured to schedule the firmware update at the particular time in a calendar.

15. A utility meter, comprising:
a non-volatile memory configured to store firmware of the utility meter;
a volatile memory configured to store a firmware update, wherein the firmware update is downloaded by periodically polling a utility service provider for updates; and
a processor configured to:
receive a historical time of use data for a customer and determine when utility usage by the customer is lowest;
receive a time of use pricing rate for the customer and determine when utility price for the customer is lowest;
receive a usage threshold associated with the utility usage by the customer and determine when the utility usage by the customer falls below the usage threshold;
receive a criticality of the firmware update and determine when the criticality exceeds a threshold criticality;
receive an updated usage threshold associated with the utility usage by the customer based on the criticality of the firmware update and determine when the utility usage by the customer falls below the updated usage threshold;
execute the firmware update at a particular time, wherein the particular time is selected based on determining one of when utility usage by the customer is lowest, when utility price for the customer is lowest, when the utility usage by the customer falls below the usage threshold, when the criticality exceeds a threshold criticality, when the utility usage by the customer falls below the updated usage threshold; and implement the firmware update at the particular time.

16. The utility meter of claim 15, wherein the usage threshold is set by a utility provider.

17. The utility meter of claim 15, wherein the processor is configured to determine the utility usage based at least in part on the firmware.

18. The utility meter of claim 15, wherein the processor is configured to stop determining the utility usage when the firmware is being updated and to resume determining the utility usage after the firmware is updated.

19. The utility meter of claim 15, wherein the volatile memory is configured to receive the firmware update from a utility service provider.

20. The utility meter of claim 15, comprising a communication card, wherein the communication card comprises the volatile memory.

* * * * *